(12) United States Patent
Kalous

(10) Patent No.: US 7,306,275 B2
(45) Date of Patent: Dec. 11, 2007

(54) RECEIVER PIN

(75) Inventor: Scott Kalous, Kenosha, WI (US)

(73) Assignee: Master Lock Company LLC, Oak Creek, WI (US)

( * ) Notice: Subject to any disclaimer, the term of this patent is extended or adjusted under 35 U.S.C. 154(b) by 0 days.

(21) Appl. No.: 11/454,026

(22) Filed: Jun. 15, 2006

(65) Prior Publication Data

US 2007/0007782 A1  Jan. 11, 2007

Related U.S. Application Data

(60) Provisional application No. 60/690,597, filed on Jun. 15, 2005.

(51) Int. Cl.
*B60J 9/00* (2006.01)

(52) U.S. Cl. .................................................... 296/1.07

(58) Field of Classification Search ............. 296/1.07; 280/504, 515; D12/162; D8/333
See application file for complete search history.

(56) References Cited

U.S. PATENT DOCUMENTS

| | | | |
|---|---|---|---|
| 2,835,510 A * | 5/1958 | Schoneberg | ................. 280/504 |
| 3,865,407 A | 2/1975 | Klassen | |
| 4,555,125 A * | 11/1985 | Goodlove | ................... 280/515 |
| 4,671,528 A * | 6/1987 | Thompson | .................. 280/504 |
| 4,890,854 A * | 1/1990 | Hoover | ....................... 280/504 |
| 5,195,561 A | 3/1993 | Wilson | |
| 5,324,152 A | 6/1994 | Anderson | |
| D356,763 S | 3/1995 | Herrick | |
| 5,662,446 A | 9/1997 | Haan | |
| 6,135,693 A | 10/2000 | Leitzke | |
| 6,145,866 A * | 11/2000 | Peter | .......................... 280/515 |
| D467,134 S | 12/2002 | Margolin | |
| 6,612,406 B1 | 9/2003 | Romak | |
| 2004/0265049 A1 | 12/2004 | Hohmann et al. | |

* cited by examiner

*Primary Examiner*—H Gutman
(74) *Attorney, Agent, or Firm*—Calfee, Halter & Griswold LLP

(57) ABSTRACT

A receiver pin is provided for attaching a ball mount to a receiver on a vehicle. The receiver pin includes a body having an insertion portion and a retaining portion. The insertion portion is sized for insertion through aligned openings in the ball mount and the receiver. The retaining portion extends at least partially laterally from a proximal end of the insertion portion for limiting axial movement of the inserted body in a first direction. The insertion portion also includes a transverse receiving aperture at a distal end for receiving a retaining clip to limit axial movement of the inserted body in a second direction.

17 Claims, 3 Drawing Sheets

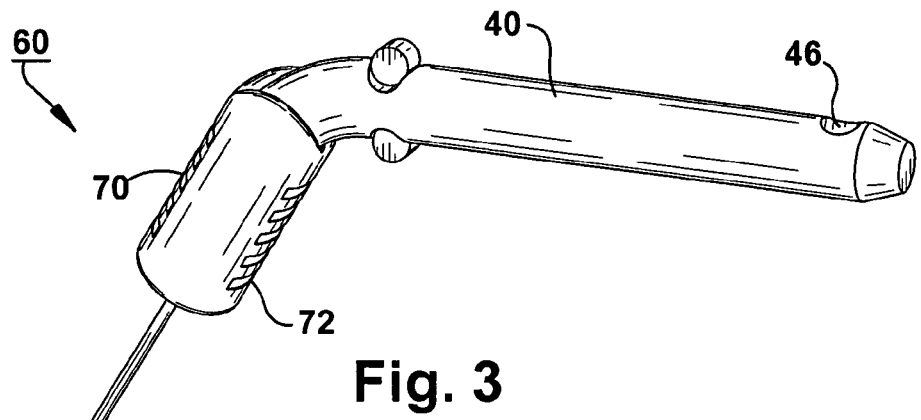
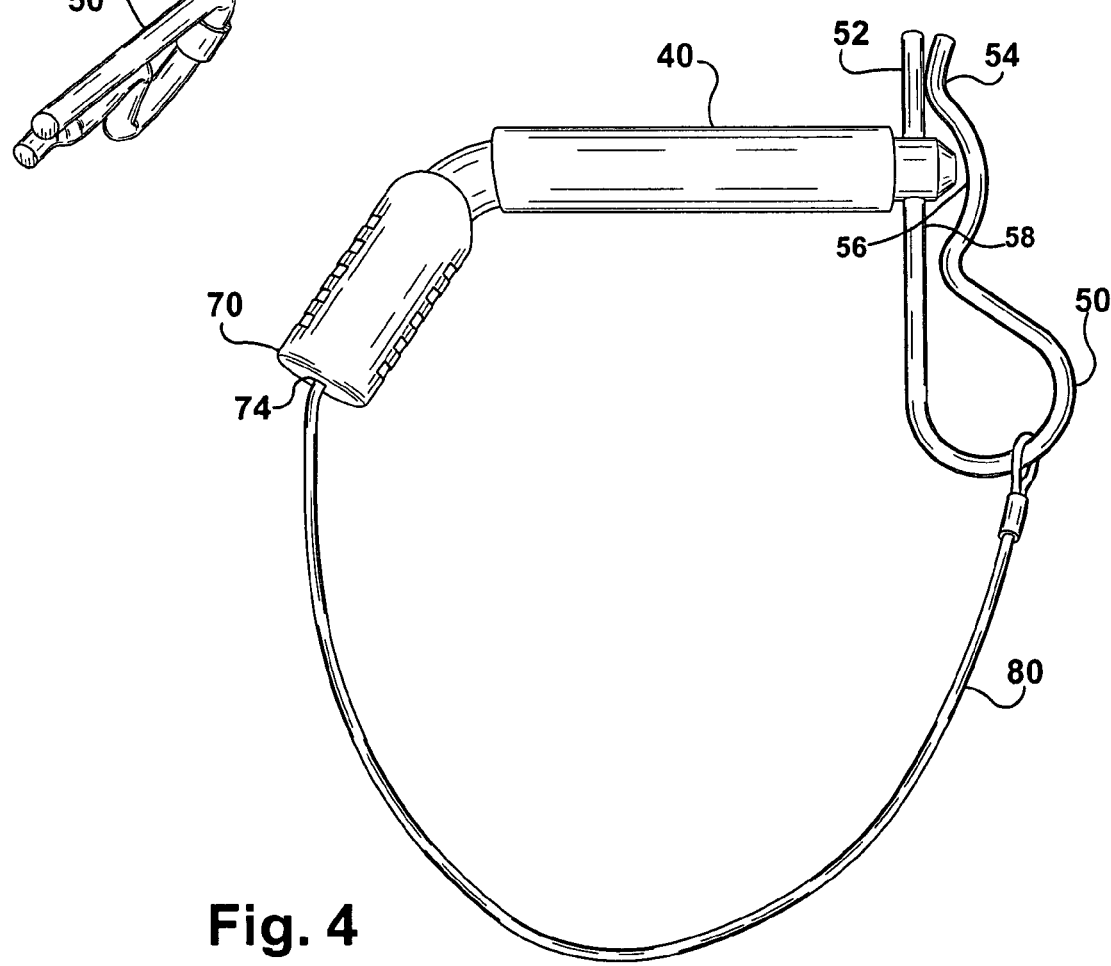

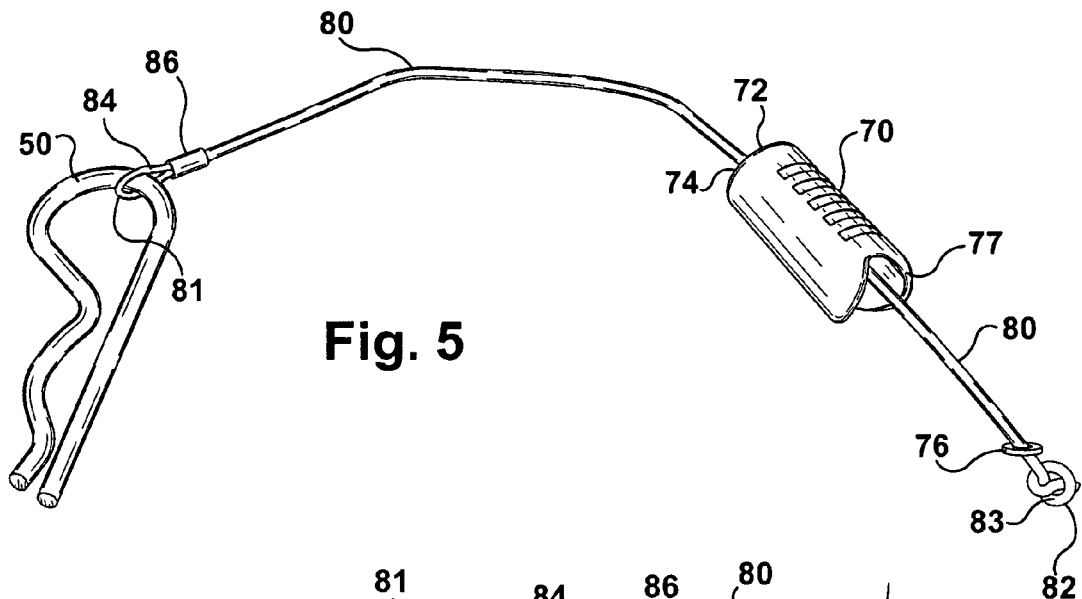
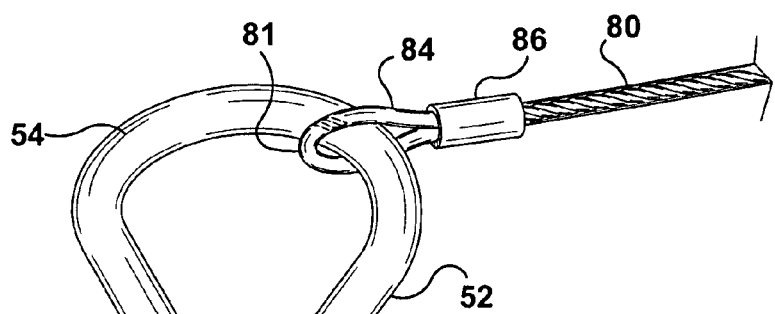
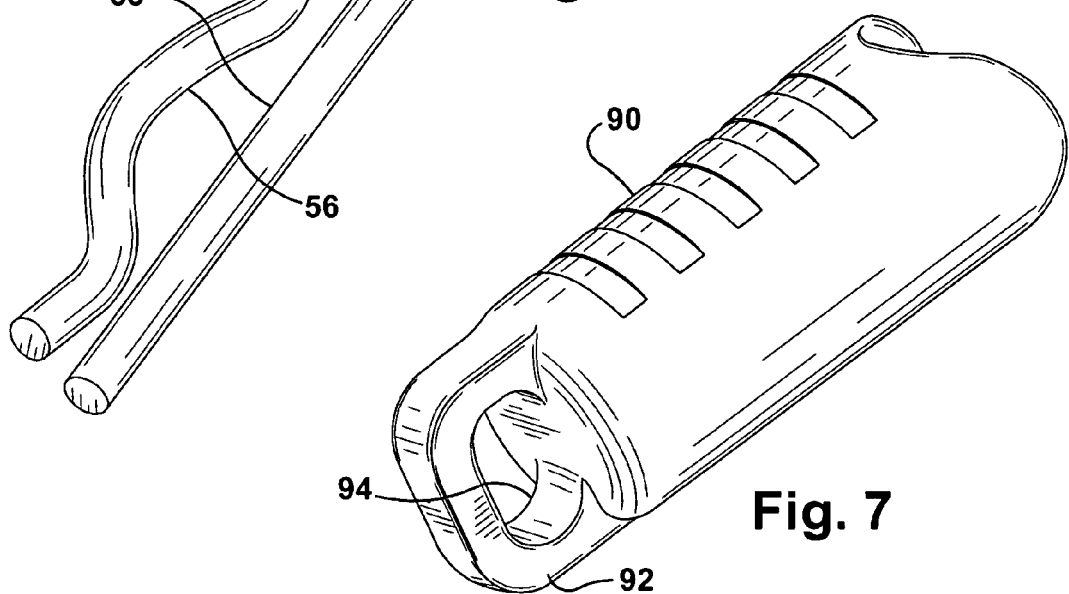

RECEIVER PIN

CROSS REFERENCE TO RELATED APPLICATIONS

This application claims the benefit of U.S. Provisional Patent Application No. 60/690,597, filed Jun. 15, 2005, the entire disclosure of which is hereby incorporated by reference.

FIELD OF THE INVENTION

The present invention relates to a receiver pin and more specifically to a receiver pin for attaching a ball mount to a receiver.

BACKGROUND OF THE INVENTION

Trucks, cars, and sport utility vehicles are commonly used to tow trailers, boats, campers and other similar items. Vehicles of this type normally include a hitch assembly having a receiver tube at the rear of the vehicle. A typical towing set-up consists of a hitch ball attached to a ball mount which is inserted into the receiver tube. The ball mount is held in the receiver by a receiver pin. The receiver pin is usually retained in place by a retaining clip or cotter pin.

SUMMARY OF THE INVENTION

The present invention relates generally to a retaining assembly for attaching a first structure, such as a ball mount, to a second structure, such as a receiver. In one aspect of the invention, a receiver pin is provided with a retaining clip, such as, for example, a cotter pin, connected to the receiver pin by a cord, such as, for example, a cable, wire, chain, or rope, to prevent loss or misplacement of the retaining clip when the retaining clip is not installed in the receiver pin for securing a trailer mount, such as, for example, a ball mount, to a receiver on a vehicle.

In one embodiment of the invention, a receiver pin is provided for attaching a trailer hitch ball mount to a receiver on a vehicle. The receiver pin includes a body having an insertion portion and a retaining portion. The insertion portion is sized for insertion through aligned openings in the ball mount and the receiver. The retaining portion extends at least partially laterally from a proximal end of the insertion portion for limiting axial movement of the inserted body in a first direction. The insertion portion also includes a transverse receiving aperture at a distal end for receiving a retaining clip to limit axial movement of the inserted body in a second direction. A cord including a first end adapted to hold a retaining clip is connected to the retaining portion.

In another aspect of the invention, a method of keeping a retaining clip proximate to a receiver pin when the retaining clip is not installed in a retaining hole of the receiver pin is provided, in which a first end of a cord is attached to the retaining clip, a second end of the cord is attached to a cap; and the cap is assembled to an end of the receiver pin.

BRIEF DESCRIPTION OF THE DRAWINGS

Further features and advantages of the invention will become apparent from the detailed description made with reference to the following drawings:

FIG. 3 is a perspective view of an embodiment of the present invention, showing a receiver pin assembly including an attached retaining clip;

FIG. 4 is a perspective view the receiver pin assembly of FIG. 3, showing the retaining clip in an inserted position within the receiver pin;

FIG. 5 is a perspective view of the receiver pin assembly of FIG. 3, showing the receiver pin removed;

FIG. 6 is a detailed perspective view of a portion of the receiver pin assembly of FIG. 3, showing the connection between the cord and the retaining clip; and FIG. 7 is a perspective view of a portion of another embodiment of the present invention, showing an alternative receiver pin cap;

DETAILED DESCRIPTION OF THE INVENTION

This Detailed Description of the Invention merely describes embodiments of the invention and is not intended to limit the scope of the claims in any way. Indeed, the invention as described is broader than and unlimited by the preferred embodiments, and the terms used have their full ordinary meaning.

The present invention relates to connecting a retaining clip to a receiver pin or receiver pin by a cord, such as, for example, a section of wire or rope, attached to a cap that may be attached to the receiver pin. This provides for easier use by preventing the relatively small pin from being dropped or lost when being installed or removed. Further, it prevents the pin from being lost during storage. This minimizes the likelihood that a user may try to use the receiver pin without the missing retaining clip.

In one embodiment, the cap may be press fit over an end of the receiver pin, allowing a standard receiver pin to be adapted to retain the retaining clip when the retaining clip is not in use. This offers several advantages over known designs in the art, in that existing receiver pins can be used or converted without machining operations or other substantial modifications performed on the pins, and in that no changes to the receiver pin manufacturing process are needed. Further, the cap may provide for improved visibility when being removed or if dropped. Further still, the cap may provide for better user grip on the pin when removing from receiver tube. Also, the use of a cap and cord as a retaining clip holder may provide a low cost method of keeping the retaining clip with the receiver pin.

Figure 1:
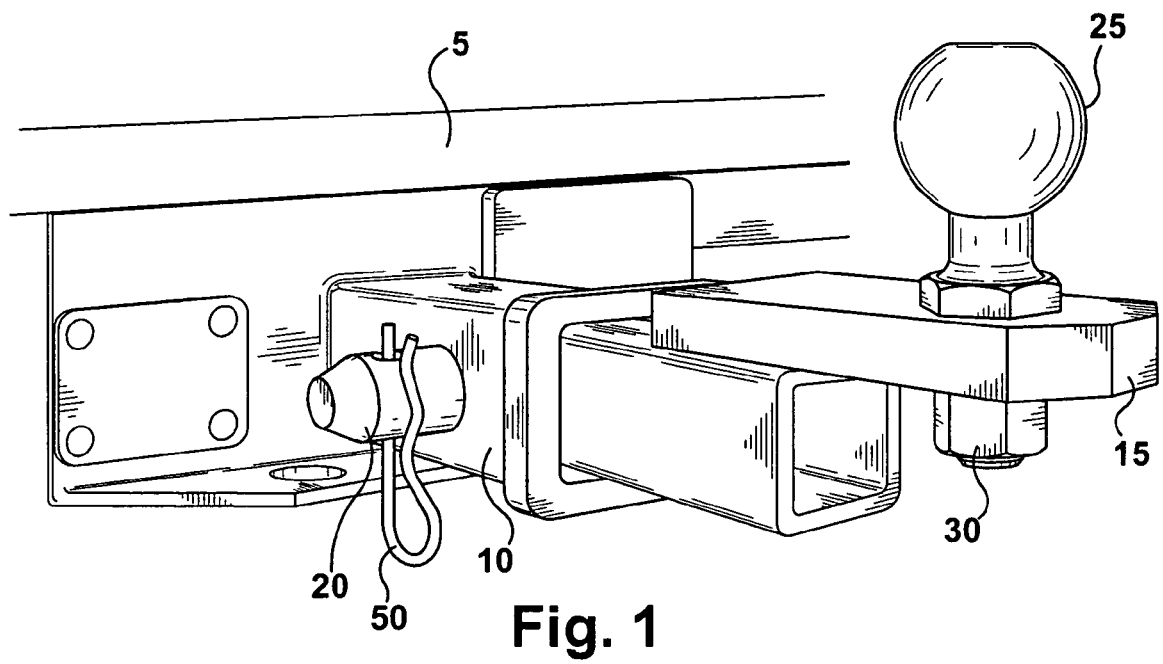
FIG. 1 is a perspective view of a typical towing arrangement on the rear of a vehicle.

A receiver pin may be used to mount a trailer hitch to a corresponding receiver on a vehicle. In one embodiment, illustrated in FIG. 1, a receiver or receiver tube 10 is illustrated fixed to the rear of the vehicle 5. As shown, a trailer hitch, such as, for example, a ball mount 15 is inserted into the receiver tube 10 and held in the receiver tube by a receiver pin 20. The receiver pin is held in place by a retaining clip 50. A ball 25 is secured to the ball mount by a retaining nut 30. It should be noted that other types of receivers and trailer hitches, attachable by a receiver pin, may be used.

Figure 2:
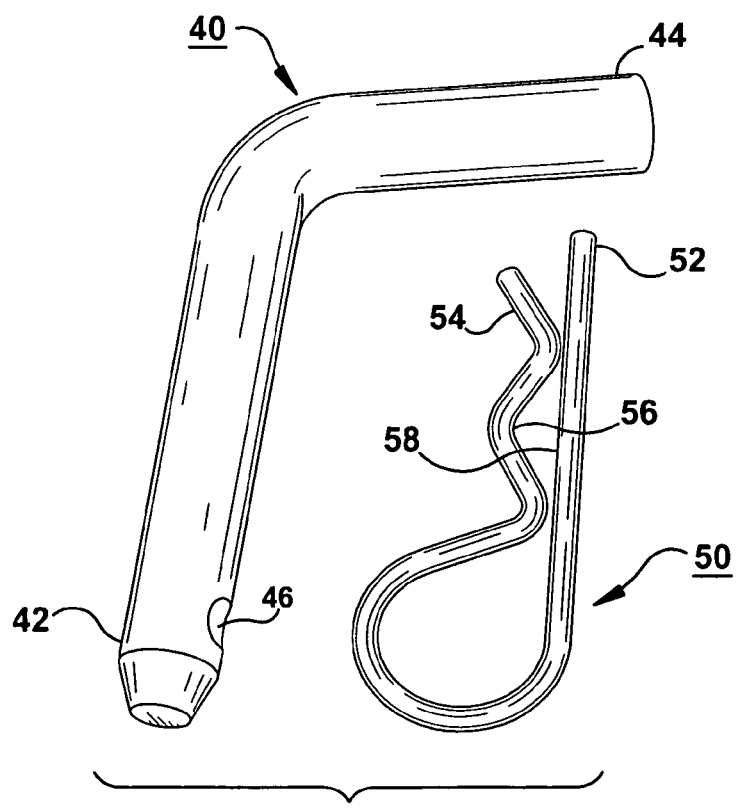
FIG. 2 is a set of perspective views of a receiver pin and a retaining clip.

FIG. 2 is a set of perspective views of a receiver pin or receiver pin body 40 and a corresponding retaining clip 50 of an embodiment of the present invention. The receiver pin 40 has a first end portion or insertion portion 42 and a second end portion or retaining portion 44. In the illustrated embodiment, the retaining portion 44 extends from a proximal end of the insertion portion 42 at least partially laterally from the insertion portion 42. However, the receiver pin may take many different shapes; for example, the receiver pin may be straight with a knob or other projection at one end to function as a retaining portion. This limits movement of the installed receiver pin 40 in a first direction to prevent removal of the receiver pin 40 from the ball mount and receiver tube in that direction. The insertion portion 42 includes a transverse receiving hole 46 at an opposite distal end, best seen in FIG. 3, for receiving the retaining clip 50. When inserted through the receiving hole 46, the retaining clip 50 limits movement of the installed receiver pin in a second direction, opposite of the first direction, to prevent removal of the receiver pin 40 from the ball mount and receiver tube in the second direction.

The retaining clip 50 includes a straight portion 52 and a curved portion 54. The straight portion is sized for insertion into the receiving hole 46 of the first end portion 42. A space defined by surfaces 56, 58 is sized to contain a portion of the receiver pin 40 to one side of the hole 46.

Referring now to FIG. 3, a receiver pin assembly 60 of an embodiment of the present invention is shown. The assembly 60 includes a receiver pin 40, a retainer clip 50, a cap 70, and a cord 80. In use or in storage, the assembly 60 maintains the retaining clip 50 within a proximity of the receiver pin 40 to prevent loss or misplacement.

The exemplary cap 70 shown is a molded plastic having a contoured surface including a series of grips 72 on an exterior surface. The cap may also be made from metal casting. The grips 72 make the receiver pin easier to grasp and insert. This feature is beneficial in various conditions, such as for example, when the cap is wet from the rain or after boating. The cap may be constructed in brightly or contrasting colored materials, for example, to make the gripping end of the receiver pin easier to identify. The cap may also be constructed to be retained on the receiver pin by a press fit seal, by an adhesive, by a threaded engagement, or any other suitable means of attachment. As such, the cap may be either permanently affixed to the pin or removable from the pin, for example, for assembly with a different retainer pin. As shown in FIG. 5, the cap 70 may be provided with a contoured end 77 to accommodate the angled retaining portion of the illustrated receiver pin 40. Other contours or cut-outs may be provided to accommodate different types of receiver pins.

FIG. 4 is a perspective view the receiver pin assembly 60 of FIG. 3, showing the retaining clip in an inserted position. As discussed, the receiver pin is held within the surface 56, 58 of the retaining clip. When installed into a ball mount in this position, additional locks may be used for security or to prevent theft. It should be apparent to others with ordinary skill in the art that other removable clip designs may be used in the practice of this invention.

In FIG. 5, the receiver pin assembly 60 of FIG. 3 is shown with the receiver pin removed. A cord 80 connects the retaining clip 50 to the cap 70. A first end or retaining clip end 81 of the cord is adapted to hold the retaining clip 50. The first end 81 may be attached to the retaining clip 50 using one of any number of clips, ties, loop, fasteners, or other such means. The attachment means may be such as to allow retaining clip 50 to be detached from the cord, or the retaining clip may be permanently affixed to the cord. In the embodiment of FIGS. 5 and 6, the first end 81 of the cord 80 is looped around the clip 50 and held in place with a crimped connector 86. FIG. 6 is a detailed perspective view of the connection between the cord 80 and the retaining clip 50. While the loop 84 of the illustrated embodiment is tight enough on the retaining clip 50 to prevent the clip from falling off, the clip 50 may still be slidably removed from the loop 84.

To secure the cord 80 to the receiver pin according to the exemplary embodiment of the invention illustrated in FIGS. 5 and 6, a second end 83 of the cord 80 may be connected to the cap 70 under an end portion 72 of the cap 70, with the cord 80 extending through an aperture 74 in the cap end portion 72. As shown in FIG. 5, the cord 80 is retained inside the cap 70. The cord 80 shown is a wire rope, but other materials, such as, for example, chain or nylon, can be used in the practice of this invention. As the cord 80 of the exemplary embodiment is only used to keep the retaining clip 50 with the receiver pin 40, and not as a weight-bearing restraint or tie, a relatively lightweight material or gauge of cord may be used. However, in some embodiments, a more durable material may be desirable.

In assembly of the illustrated embodiment, the second end 83 of the cord 80 is inserted through the aperture 74 in the end portion or face 72 of the cap 70. Beneath the cap 70, the cord 80 is inserted through a washer 76 and tied off in a knot 82. The diameter of the tie off or knot 82 prevents the cord 80 from slipping out of the cap 70 and separating from the receiver pin 40.

It should be understood by others with ordinary skill in the art that other connection methods can be made at each end of the cord 80. In one exemplary alternative embodiment, illustrated in the perspective view of FIG. 7, an alternative receiver pin cap 90 may be provided for attachment of the cord to the receiver pin. As illustrated, the cap 90 includes a protruding loop 92 that defines an aperture 94. The cord, such as the cord 80 of FIGS. 3-6, can be connected to the cap 90 using this aperture 94, either with a crimped connector 86 and end loop 84 such as the type shown in FIGS. 5 and 6, or with one of any number of clips, ties, loops, fasteners, or other such means.

While the illustrated embodiment includes a cap assembled to an end of the receiver pin, other configurations may be provided to attach a cord to a receiver pin. As one example, a plastic sleeve, retaining an end of the cord and optionally providing a gripping surface, may be attached to any portion of the receiver pin. As another example, a hole may be provided in the retaining portion of the pin, through which an end of a cord may be tied or otherwise secured.

While several embodiments of the invention has been illustrated and described in considerable detail, the present invention is not to be considered limited to the precise constructions disclosed. Various adaptations, modifications and uses of the invention may occur to those skilled in the arts to which the invention relates. It is the intention to cover all such adaptations, modifications and uses falling within the scope or spirit of the claims filed herewith.

What is claimed is:

1. A receiver pin for attaching a ball mount to a receiver on a vehicle, the receiver pin comprising:
   a body, comprising an insertion portion sized for insertion through aligned openings in the ball mount and the receiver, and a retaining portion extending at least partially laterally from a proximal end of the insertion portion for limiting axial movement of the inserted body in a first direction, the insertion portion including a transverse receiving aperture at a distal end for receiving a retaining clip to limit axial movement of the inserted body in a second direction; and
   a cord, adapted to hold a retaining clip at a first end of the cord, the cord being connected to the retaining portion at a second end of the cord.

2. The receiver pin of claim 1, wherein the cord comprises a loop at the first end for holding the retaining clip.

3. The receiver pin of claim 1, further comprising a cap assembled over the retaining portion of the body, wherein the cord is connected to the cap.

4. The receiver pin of claim 3, wherein the second end of the cord is connected to an interior portion of the cap, the cord extending through an aperture in the cap.

5. The receiver pin of claim 4, wherein the second end of the cord is secured to a washer disposed between the cap and the retaining portion.

6. The receiver pin of claim 3, wherein the cord comprises a loop at the first end for holding the retaining clip.

7. The receiver pin of claim 3, wherein the second end of the cord is connected to a loop disposed on an outer surface of the cap.

8. The receiver pin of claim 3, wherein the cap comprises a contoured gripping surface.

9. The receiver pin of claim 3, wherein the cap is press fit over the retaining portion.

10. The retaining clip holder of claim 9, wherein the second end of the cord is connected to an interior portion of the cap, the cord extending through an aperture in the cap.

11. The retaining clip holder of claim 9, wherein the second end of the cord is connected to a loop disposed on an outer surface of the cap.

12. The retaining clip holder of claim 9, wherein the cap comprises a contoured gripping surface.

13. The retaining clip holder of claim 9, wherein the cap is sized to be press fit over the retaining portion of the receiver pin.

14. A retaining clip holder for a receiver pin comprising an insertion portion sized for insertion through aligned openings in a ball mount and a receiver, and a retaining portion extending at least partially laterally from a proximal end of the insertion portion, the retaining clip holder comprising:
   a cap, adapted to be assembled over the retaining portion of the receiver pin; and a cord, including a loop at a first end of the cord for holding a retaining clip, the cord being connected at a second end of the cord to the cap.

15. A method of keeping a retaining clip proximate to a receiver pin when the retaining clip is not installed in a retaining hole of the receiver pin, the method comprising:

attaching a first end of a cord to the retaining clip;

attaching a second end of the cord to a cap; and assembling the cap to an end of the receiver pin.

16. A receiver pin assembly for attaching a ball mount to a receiver on a vehicle, the assembly comprising:
   a receiver pin, comprising an insertion portion sized for insertion through aligned openings in the ball mount and the receiver, and a retaining portion extending at least partially laterally from a proximal end of the insertion portion for limiting axial movement of the inserted receiver pin in a first direction, the insertion portion including a transverse receiving aperture at a distal end;
   a cap, press fit over the retaining portion of the receiver pin, the cap comprising a contoured gripping surface;
   a retaining clip, adapted to be inserted through the transverse receiving aperture of the receiver pin to limit axial movement of the inserted receiver pin in a second direction; and
   a cord, connected to the retaining clip at a first end of the cord and secured at a second end of the cord to a washer disposed between the cap and the receiver pin, wherein the cord extends through an aperture in the cap.

17. A retaining assembly for attaching a ball mount to a receiver on a vehicle, the assembly comprising:
   a receiver pin, comprising an insertion portion sized for insertion through aligned openings in the ball mount and the receiver, and a retaining portion extending for limiting axial movement of the inserted receiver pin in a first direction, the insertion portion including a transverse receiving aperture at a distal end;
   a retaining clip, adapted to be inserted through the transverse receiving aperture of the receiver pin to limit axial movement of the inserted receiver pin in a second direction; and
   a cord, connected to the retaining clip at a first end of the cord and secured at a second end of the cord to the retaining portion of the receiver pin.

* * * * *